(12) United States Patent
Chen et al.

(10) Patent No.: US 11,402,677 B2
(45) Date of Patent: Aug. 2, 2022

(54) OPTICAL FILM AND METHOD OF MANUFACTURING THE SAME, BACKLIGHT MODULE, AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Ying Chen, Beijing (CN); Shanshan Liu, Beijing (CN); Lili Jia, Beijing (CN); Bochang Wang, Beijing (CN); Donglei Li, Beijing (CN); Hui Liu, Beijing (CN); Honghao Yu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 155 days.

(21) Appl. No.: 16/917,518

(22) Filed: Jun. 30, 2020

(65) Prior Publication Data
US 2021/0003874 A1    Jan. 7, 2021

(30) Foreign Application Priority Data
Jul. 4, 2019 (CN) .......................... 201921034895.5

(51) Int. Cl.
*G02F 1/133* (2006.01)
*G02B 1/10* (2015.01)
*G02F 1/03* (2006.01)
*G02F 1/1677* (2019.01)
*G02F 1/1333* (2006.01)

(52) U.S. Cl.
CPC ........... *G02F 1/13306* (2013.01); *G02B 1/10* (2013.01); *G02F 1/0316* (2013.01); *G02F 1/1677* (2019.01); *G02F 1/133317* (2021.01)

(58) Field of Classification Search
None
See application file for complete search history.

(56) References Cited

U.S. PATENT DOCUMENTS

| 2010/0309682 A1* | 12/2010 | Shiau | G02F 1/133606 362/609 |
| 2011/0019435 A1* | 1/2011 | Teng | G02B 6/0053 359/622 |
| 2011/0234942 A1* | 9/2011 | Nakagome | G02B 5/0231 349/64 |
| 2013/0286679 A1* | 10/2013 | Chen | G02B 6/0051 362/625 |

* cited by examiner

*Primary Examiner* — Ashok Patel
(74) *Attorney, Agent, or Firm* — Procopio, Cory, Hargreaves & Savitch LLP

(57) ABSTRACT

An optical film includes a light-transmissive substrate and a first annular lens group. The light-transmissive substrate has a first surface and a second surface opposite to each other. The first annular lens group is disposed on the second surface, and the first annular lens group is configured to allow light to pass through. The reflectivity of the first annular lens group decreases along a direction away from a central axis of the first annular lens group, and an extending direction of the central axis is the same as a thickness direction of the light-transmissive substrate.

17 Claims, 12 Drawing Sheets

OPTICAL FILM AND METHOD OF MANUFACTURING THE SAME, BACKLIGHT MODULE, AND DISPLAY APPARATUS

CROSS-REFERENCE TO RELATED APPLICATION

This application claims priority to and the benefit of Chinese Patent Application No. 201921034895.5, filed on Jul. 4, 2019, which is incorporated herein by reference in its entirety.

TECHNICAL FIELD

The present disclosure relates to the field of liquid crystal display technology, and in particular, to an optical film and a method of manufacturing the same, a backlight module, and a display apparatus.

BACKGROUND

Mini LED backlight display technology is widely used in ultra-thin display devices because it can provide a better color gamut, realize fine local dimming, and thus achieve a high-dynamic range (HDR) image effect.

SUMMARY

Some embodiments of the present disclosure provide an optical film. The optical film includes a light-transmissive substrate and a first annular lens group. The light-transmissive substrate has a first surface and a second surface opposite to each other. The first annular lens group is disposed on the second surface, and the first annular lens group is configured to allow light to pass through. The reflectivity of the first annular lens group decreases along a direction away from the central axis of the first annular lens group, and an extending direction of the central axis is the same as a thickness direction of the light-transmissive substrate.

In some embodiments of the present disclosure, the first annular lens group includes a plurality of first annular lenses, the plurality of first annular lenses are substantially concentric about the central axis and arranged radially adjacent to one another. The distance between an inner surface of each first annular lens and the central axis in a radial direction of the first annular lens decreases along a direction that is parallel to the central axial and points toward the second surface. The angles each between the second surface and a tangent plane of an inner surface of a corresponding first annular lens in the plurality of first annular lenses are acute angles and decrease in the direction away from the central axis.

In some embodiments of the present disclosure, the angles each between the second surface and the tangent plane of the inner surface of the corresponding first annular lens in the plurality of first annular lenses are different from each other, or some of the angles each between the second surface and the tangent plane of the inner surface of the corresponding first annular lens in the plurality of first annular lenses are the same.

In some embodiments of the present disclosure, each of intersecting lines of the inner surface of the first annular lens and a plane passing through the central axis includes at least one of at least one straight line segment or at least one curved line segment. The at least one straight line segment includes a straight line segment that is continuously inclined with respect to the second surface, or straight line segments that are connected in a stepped shape and intermittently inclined with respect to the second surface. The at least one curved line segment includes a curved line segment that is continuously inclined with respect to the second surface or curved line segments that are connected in another stepped shape and intermittently inclined with respect to the second surface.

In some embodiments of the present disclosure, the first surface has a light coverage region and a non-light coverage region surrounding the light coverage region. The orthographic projection of the first annular lens group on the first surface covers both the light coverage region and the non-light coverage region.

In some embodiments of the present disclosure, the optical film further includes a second annular lens group disposed on the first surface, wherein the second annular lens group is located in the non-light coverage region and configured to reflect light, and the second annular lens group includes a plurality of second annular lenses arranged radially adjacent to one another.

In some embodiments of the present disclosure, refractive index of the first annular lens group is greater than refractive index of air, and/or, refractive index of the second annular lens group is greater than the refractive index of air.

In some embodiments of the present disclosure, the distance between an outer surface of each second annular lens and its central axis in a radial direction of the second annular lens increases along the direction that is parallel to the central axis of the second annular lens and points toward the first surface.

In some embodiments of the present disclosure, angles each between the first surface and a tangent plane of an outer surface of a corresponding second annular lens in the plurality of second annular lenses are the same, or, the angles between the first surface and the tangent plane of the outer surface of the corresponding second annular lens in the plurality of second annular lenses are different from each other.

In some embodiments of the present disclosure, each of intersecting lines of the outer surface of the second annular lens and a plane passing through the central axis of the second annular lens includes at least one of at least one straight line segment or at least one curved line segment. The at least one straight line segment includes a straight line segment that is continuously inclined with respect to the first surface or straight line segments that are connected in a stepped shape and intermittently inclined with respect to the first surface. The at least one curved line segment includes a curved line segment that is continuously inclined with respect to the first surface or curved line segments that are connected in another stepped shape and intermittently inclined with respect to the first surface.

Some embodiments of the present disclosure provide a backlight module. The backlight module includes the optical film provided by some embodiments described above and a light-emitting device disposed at a side of the first surface of the light-transmissive substrate. The orthographic projection of the light-emitting device on the first surface is within an orthographic projection of the first annular lens group on the first surface.

In some embodiments of the present disclosure, the first surface includes alight coverage region and a non-light coverage region surrounding the light coverage region. The orthographic projection of the light-emitting device on the first surface is located in the light coverage region. The orthographic projection of the first annular lens group on the first surface covers both the light coverage region and the non-light coverage region.

In some embodiments of the present disclosure, the backlight module further includes a reflective plate disposed at a side of the light-emitting device away from the first surface, and/or, a brightness enhancement film disposed at a side of the first annular lens group away from the light-transmissive substrate.

In some embodiments of the present disclosure, the light-emitting device includes mini light-emitting diode (Mini LED).

Some embodiments of the present disclosure further provide a display apparatus. The display apparatus includes a display panel and the backlight module provided by some embodiments described above. The backlight module being configured to provide backlight for the display panel.

Some embodiments of the present disclosure further provide a method of manufacturing an optical film. The method of manufacturing the optical film includes: forming the first annular lens group on the second surface of the light-transmissive substrate. The reflectivity of the first annular lens group decreases along the direction away from the central axis, and the extending direction of the central axis is the same as the thickness direction of the light-transmissive substrate.

In some embodiments of the present disclosure, forming the first annular lens group on the second surface of the light-transmissive substrate includes: forming the first annular lens group on the second surface through an etching process, or forming the first annular lens group on the second surface through an imprinting process.

In some embodiments of the present disclosure, the method of manufacturing the optical film further includes: forming a curable light-transmissive resin layer on the second surface, performing imprinting on the curable light-transmissive resin layer to form first annular lens group to be cured, and curing the first annular lens group to be cured to form the first annular lens group.

In some embodiments of the present disclosure, in the case where a first surface of the light-transmissive substrate has a light coverage region and a non-light coverage region surrounding the light coverage region, the method of manufacturing the optical film further includes: forming the second annular lens group in the non-light coverage region on the first surface of the light-transmissive substrate, wherein an orthographic projection of the first annular lens group on the first surface covers both the light coverage region and the non-light coverage region.

BRIEF DESCRIPTION OF THE DRAWINGS

In order to describe technical solutions in embodiments of the present disclosure more clearly, the accompanying drawings to be used in the description of some embodiments of the present disclosure will be introduced briefly. However, the accompanying drawings to be described below are merely accompanying drawings of some embodiments of the present disclosure, and a person of ordinary skill in the art can obtain other drawings according to these drawings without paying any creative effort.

DETAILED DESCRIPTION

Figure 1:
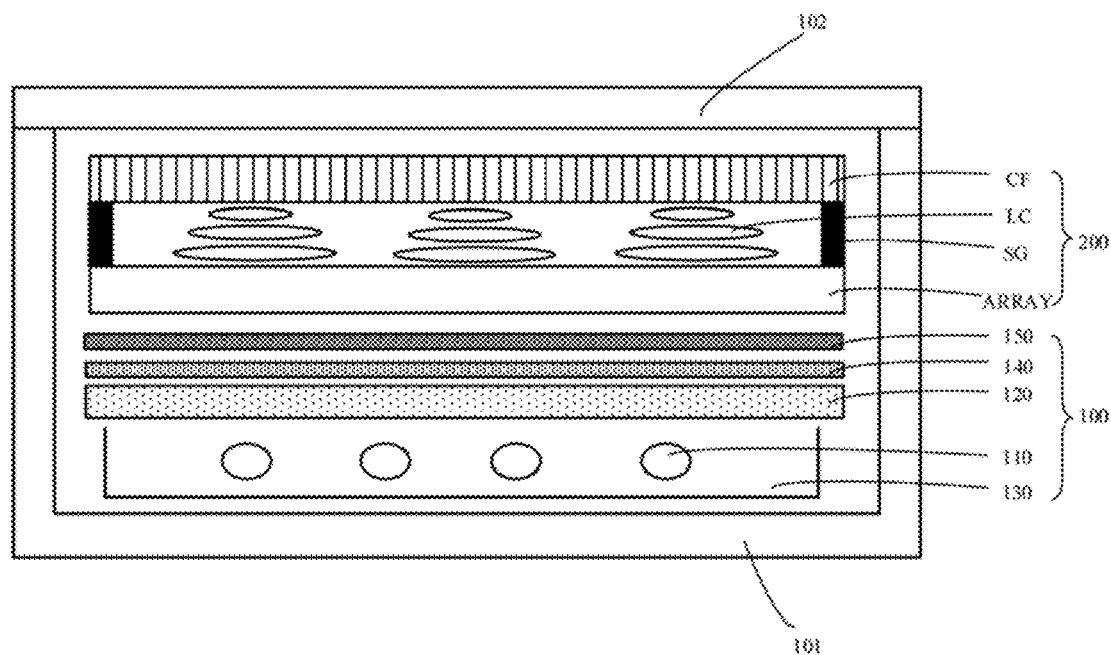
FIG. 1 is a schematic diagram showing a structure of a display apparatus.

The technical solutions in some embodiments of the present disclosure will be described clearly and completely with reference to the accompanying drawings in some embodiments of the present disclosure. However, the described embodiments are merely some but not all of embodiments of the present disclosure. All other embodiments made on the basis of some embodiments of the present disclosure by a person of ordinary skill in the art without paying any creative effort shall be included in the protection scope of the present disclosure.

Unless the context requires otherwise, term "comprise" and other forms thereof such as the third-person singular form "comprises" and the present participle form "comprising" in the description and the claims are construed as open and inclusive, i.e., "inclusive, but not limited to". The words "first", "second" and the like used in the present disclosure are not intended to indicate any order, quantity or importance, but are merely used to distinguish different components.

Terms "connected", "coupled" and similar words are not limited to physical or mechanical connection, but may include electrical connection, whether direct or indirect.

Orientations or positional relationships indicated by terms "upper", "lower", "inner". "outer", etc. are based on orientations or positional relationships shown in the drawings, which are used merely to facilitate and simplify the description of the present disclosure, and are not used to indicate or imply that the referred devices or elements must have a particular orientation, or must be constructed or operated in a particular orientation. Therefore they should not be construed as limitations to the present disclosure.

Phrase "A and/or B" includes the following three situations: only A, only B, and a combination of A and B.

In the description of the specification, terms such as "one embodiment", "some embodiments", "exemplary embodiments", "example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments/examples in any suitable manner.

It will also be understood that when a layer or element is referred to as being "on" another layer or substrate, it can be directly on the another layer or the substrate, or one or more intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 5:
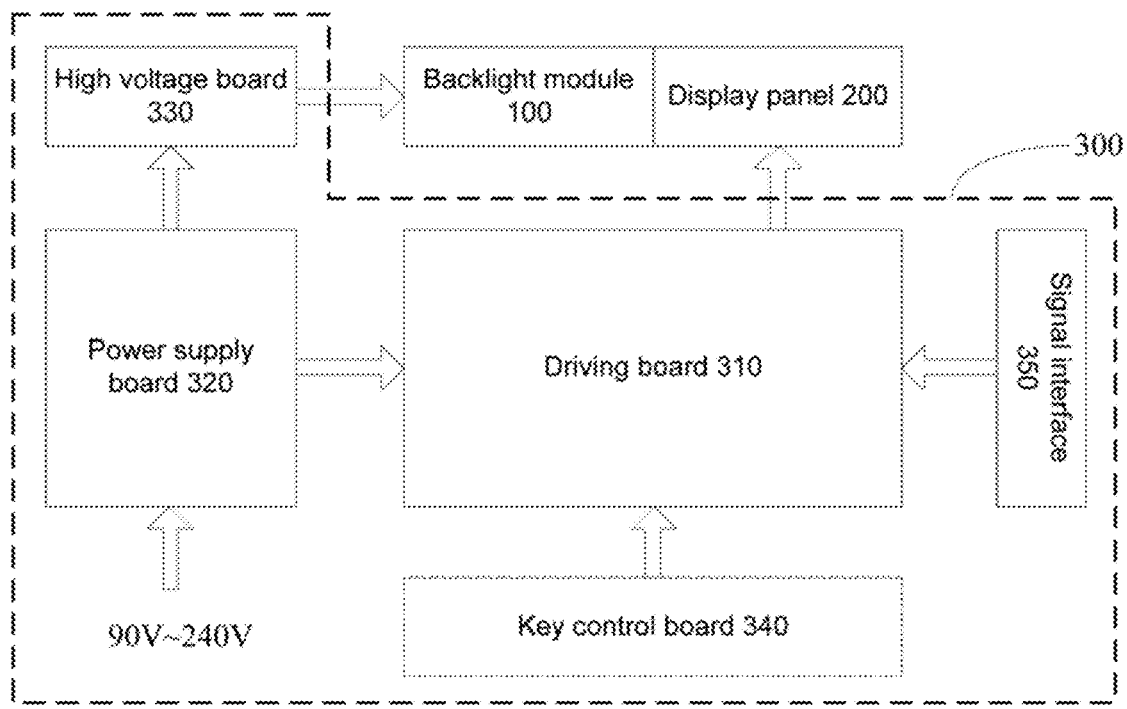
FIG. 5 is a schematic diagram showing a structure of a control unit.

As shown in FIGS. 1 and 5, a display apparatus includes a frame 101, a cover plate 102, a backlight module 100, a display panel 200 and a controller 300. The frame 101 has an accommodating space inside. The backlight module 100, the display panel 200 and other electronic components are arranged in the accommodating space, and the cover plate 102 is provided at an opening of the frame 101. The display panel 200 is disposed closer to the cover plate 102 relative to the backlight module 100, and the backlight module 100 is disposed away from the cover plate 102 relative to the display panel 200.

Figure 2:
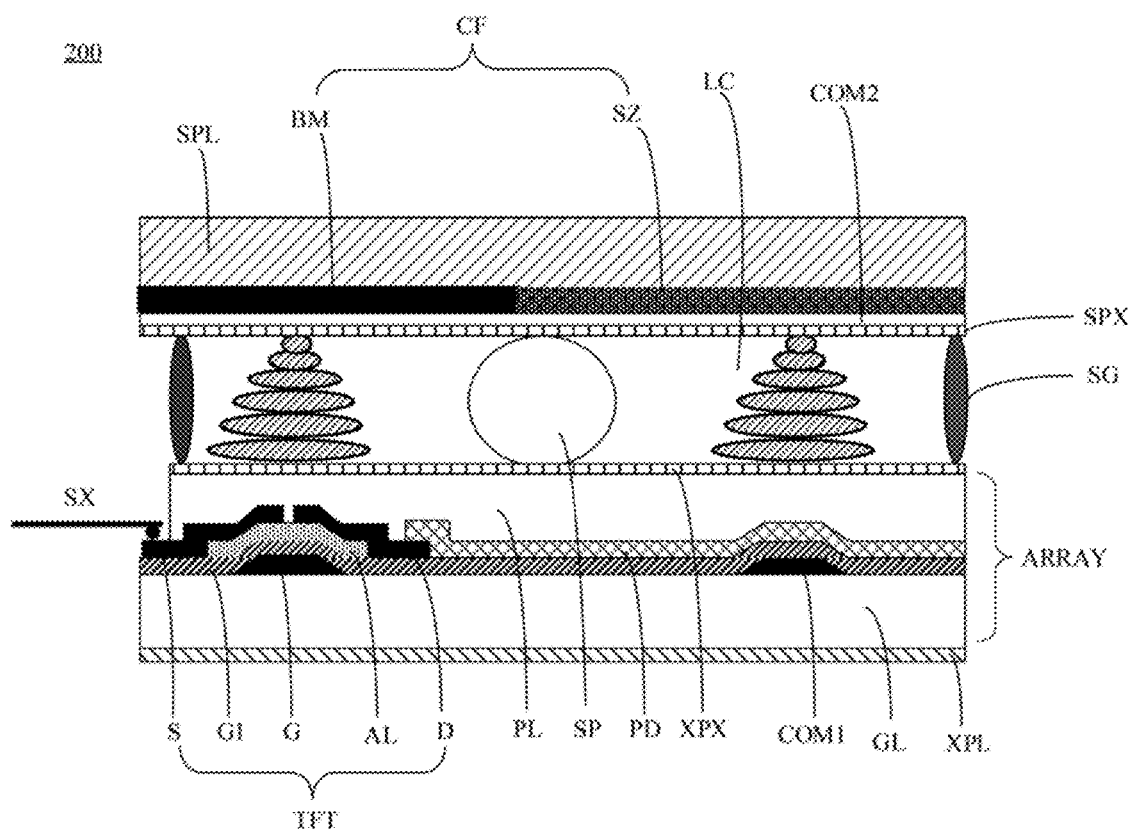
FIG. 2 is a schematic diagram showing a structure of a display panel of the display apparatus shown in FIG. 1.

As shown in FIG. 2, the display panel 200 includes: an array substrate ARRAY, a color filter substrate CF disposed opposite to the array substrate ARRAY, and a liquid crystal layer LC disposed between the array substrate ARRAY and the color filter substrate CF. The array substrate ARRAY and the color filter substrate CF can be bonded together by an encapsulation sealant SG, so that the liquid crystal layer LC is sealed in the space enclosed by the encapsulation sealant SG. The display panel 200 further includes a first polarizer XPL and a second polarizer SPL. The first polarizer XPL is disposed on a side of the array substrate ARRAY away from the color filter substrate CF, and the second polarizer SPL is disposed on a side of the color filter substrate CF away from the array substrate ARRAY. In order to ensure that the display panel 200 can maintain a certain cell gap when subject to an external force, spacers SP are provided between the array substrate ARRAY and the color filter substrate CF, so that a gap is formed between the array substrate ARRAY and the color filter substrate CF, and the liquid crystal layer LC can be disposed in the gap.

Figure 3:
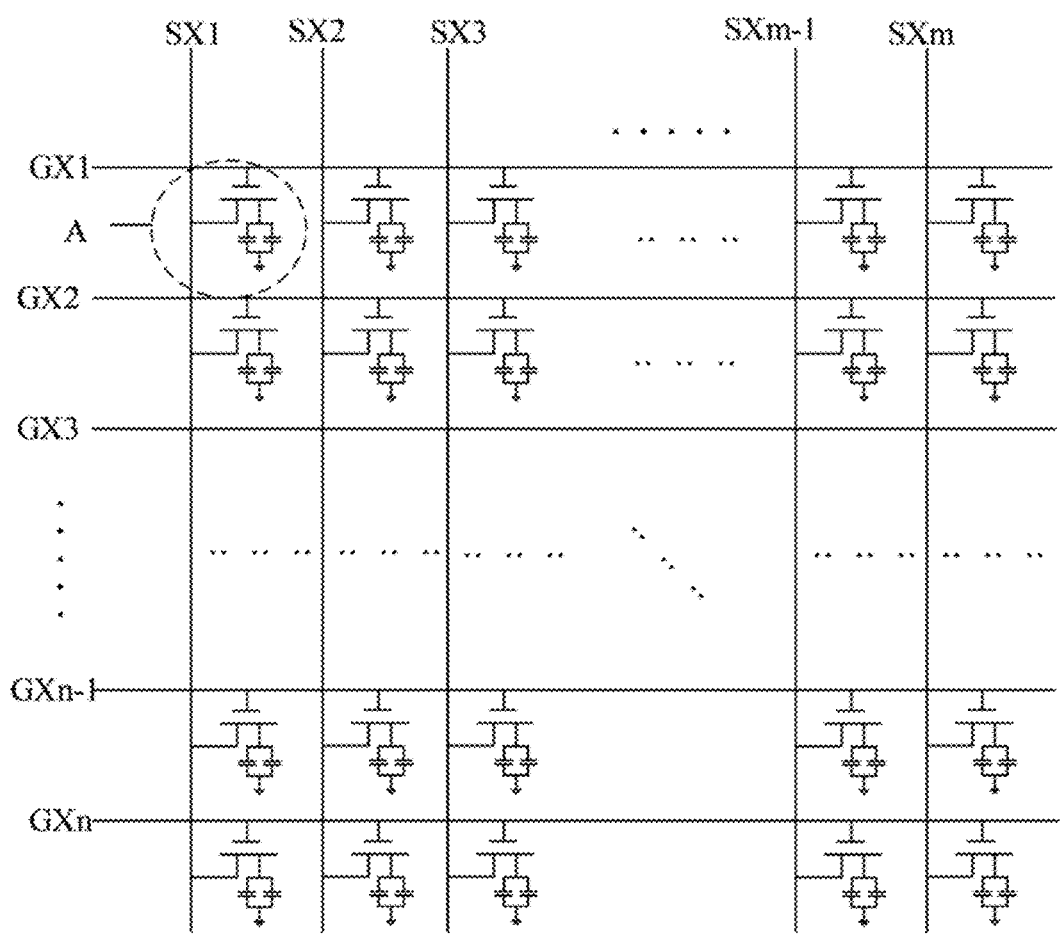
FIG. 3 is a circuit principle diagram of a display panel.

As shown in FIG. 2, the array substrate ARRAY includes a base substrate GL, thin film transistors TFT arranged in an array on the base substrate GL, lower common electrodes COM1 arranged in an array, and pixel electrodes PD arranged in an array. The thin film transistors TFT and the lower common electrodes COM1 are both in one-to-one correspondence with the pixel electrodes PD. There are many types of thin film transistors TFT. For example, the thin film transistors TFT may be N-type thin film transistors, or P-type thin film transistors. A difference therebetween only lies in a turn-on condition. N-type thin film transistors are turned on under control of a high level signal, and are turned off under control of a low level signal. P-type thin film transistors are turned on under control of a low level signal, and are turned off under control of a high level signal. However, in any case, a thin film transistor TFT includes a gate G, a gate insulating layer GI, an active layer AL, and source-drain electrodes, all of which are arranged along a direction away from the base substrate GL. The source-drain electrodes. Include a source S and a drain D. A protective layer PL is provided on the source-drain electrodes and the pixel electrodes PD. The lower common electrodes COM1, the gate G and gate lines GX shown in FIG. 3 are disposed in a same layer. The pixel electrodes PD are disposed in a same layer as the source-drain electrodes, and are connected to drains D included in the source-drain electrodes. Signal lines SX shown in FIG. 3 are connected to sources S. It will be understood that, the pixel electrode PD may also be connected to the source S, and the signal line SX may also be connected to the drain D. It will also be understood that, the thin film transistor TFT shown in FIG. 2 is a TFT having a bottom gate structure. For another example, the thin film transistor TFT of the array substrate ARRAY may also be a TFT having a top gate structure.

As shown in FIG. 2, the color filter substrate CF includes a color filter layer. The color filter layer includes a plurality of color photoresists SZ and a black matrix BM formed among the color photoresists. The plurality of color photoresists SZ form a color photoresist array. The plurality of color photoresists SZ include at least a red photoresist unit, a green photoresist unit and a blue photoresist unit which are all in one-to-one correspondence with sub-pixel regions on the array substrate ARRAY. The black matrix BM is used to separate the red photoresist unit, the green photoresist unit and the blue photoresist unit, so as to avoid crosstalk between light emitted from adjacent sub-pixel regions. In addition, the color filter substrate CF further includes an upper common electrode COM2 at a side of the color filter layer proximate to the liquid crystal layer LC. It will be understood that, the color filter layer (including the black matrix BM and the plurality of color photoresists SZ) may also be disposed in the array substrate ARRAY. In this case, the color filter substrate CF shown in FIG. 2 can be replaced with an opposite substrate that is not provided with a color filter layer.

In order to align liquid crystal molecules, as shown in FIG. 2, the display panel 200 further includes an upper alignment layer SPX disposed on a side of the color filter substrate CF proximate to the liquid crystal layer LC, and a lower alignment layer XPX disposed on a side of the array substrate ARRAY proximate to the liquid crystal layer LC. Liquid crystal molecules can be effectively aligned through joint action of the upper alignment layer SPX and the lower alignment layer XPX.

Figure 4:
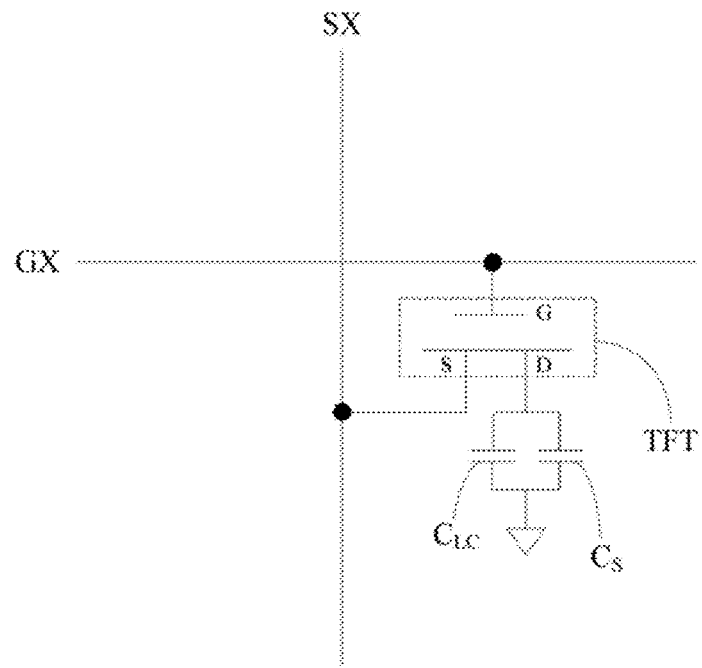
FIG. 4 is an enlarged schematic diagram of a structure in the dashed circle A shown in FIG. 3.

It will be understood that, in order to control the thin film transistors to be turned on and turned off, as shown in FIGS. 2 to 4, the array substrate ARRAY further. Includes a plurality of gate lines GX and a plurality of signal lines SX. The plurality of gate lines GX and the plurality of signal lines SX are crossed but not electrically connected, thereby defining a plurality of sub-pixel regions arranged in an array. The thin film transistors TFT and the pixel electrodes PD are arranged in the plurality of sub-pixel regions in one-to-one correspondence. Each gate line GX is connected to gates G of a corresponding row of thin film transistors TFT, and each signal line SX is connected to sources S or drains D of a corresponding column of thin film transistors TFT.

For example, as shown in FIGS. 2 to 4, the array substrate ARRAY includes n gate lines GX, m signal lines SX, and (m×n) thin film transistors TFT arranged in an array. Herein, m and n are positive integers, and (m×n) represents a product of m and n. As shown in FIG. 3, a first gate line GX1 is connected to gates of thin film transistors in the first row, a second gate line GX2 is connected to gates of thin film transistors in the second row, . . . , an (n−1)th gate line GX(n−1) is connected to gates of thin film transistors in the (n−1)th row, and an nth gate line GXn is connected to gates of thin film transistors in the nth row. A first signal line SX1 is connected to sources of thin film transistors in the first column, a second signal line SX2 is connected to sources of thin film transistors in the second column, a third signal line SX3 is connected to sources of thin film transistors in the third column, . . . , an (m−1)th signal line SX(m−1) is connected to sources of thin film transistors in the (m−1)th column, and an mth signal line SXm is connected to sources of thin film transistors in the mth column.

As shown in FIGS. 2 and 4, the lower common electrode COM1 and the pixel electrode PD may form a capacitor $C_S$, and the pixel electrode PD, the liquid crystal layer LC and the upper common electrode COM2 form a liquid crystal capacitor $C_{LC}$. A gate G of each thin film transistor TFT is connected to the gate line GX, a source S of each thin film transistor TFT is connected to a corresponding signal line SX, and a drain D of each thin film transistor TFT is connected to a liquid crystal capacitor $C_{LC}$ and a capacitor $C_S$.

As shown in FIG. 5, the controller 300 includes a driving board 310, a power supply board 320, a high voltage board 330, and a signal interface 350. The controller 300 may further include a key control board 340. The power supply board 320 is connected to the high voltage board 330 and the driving board 310, and the signal interface 350 and the key control board 340 are both connected to the driving board 310.

The power supply board 320 is used to convert an alternating current (AC) voltage of 90V~240V into a direct current (DC) voltage of 36V, 24V, 18V, 12V, 5V, or 3V, etc. as needed.

The high voltage board 330, also known as the backlight board, is used to convert the DC voltage of 36V, 24V, 18V, 12V, 5V, or 3V, etc. output by the power supply board 320 into a voltage required by the backlight module 100.

The driving board 310, also known as the motherboard, is mainly used to receive and process analog video signals or digital video signals from the outside, and send them to the display panel 200, so as to control the display panel 200 to work normally.

Figure 6:
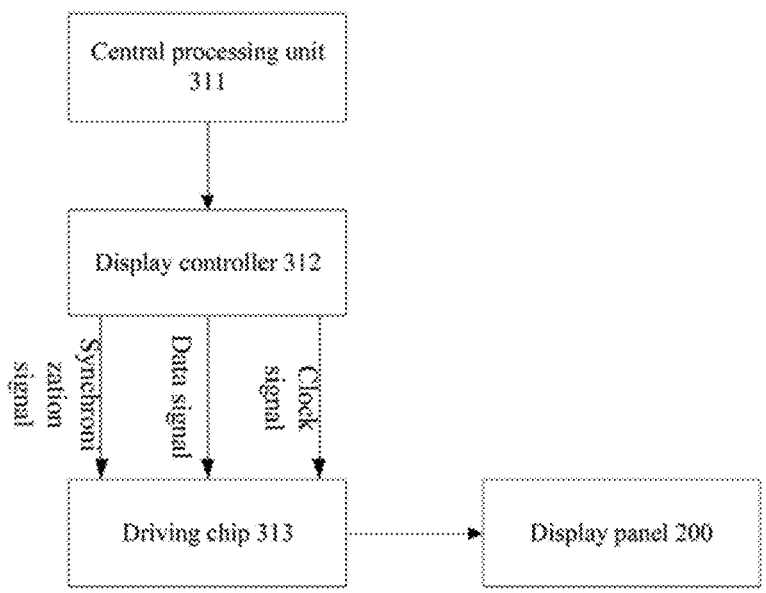
FIG. 6 is a schematic diagram showing a structure of the driving board shown in FIG. 5.

As shown in FIG. 6, the driving board 310 mainly includes a central processing unit 311, a display controller 312, and a driving chip 313.

Figure 7:
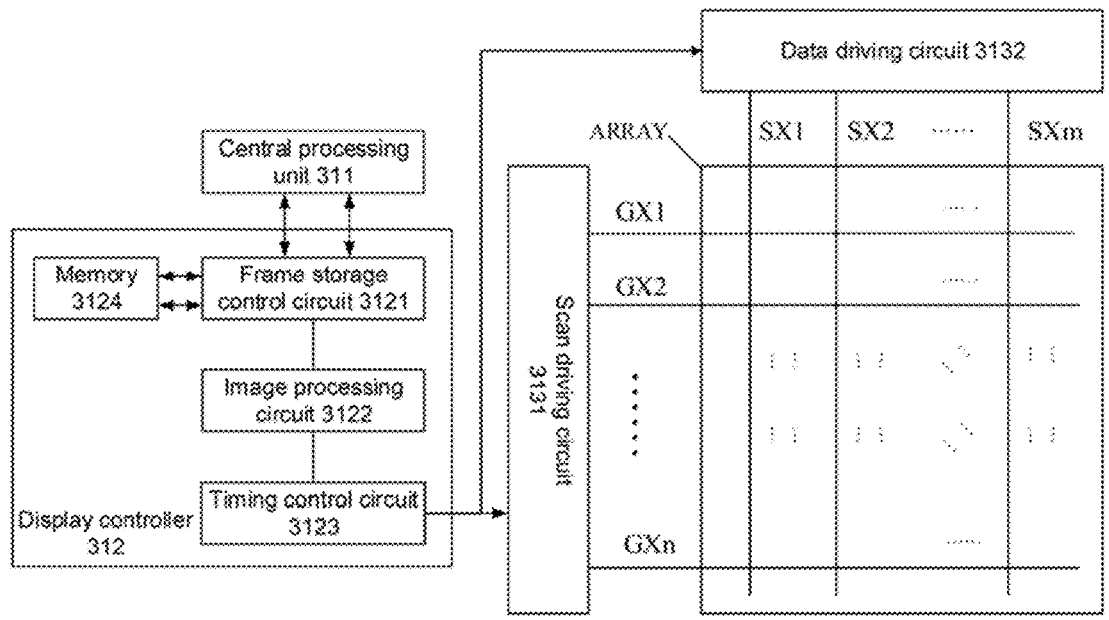
FIG. 7 is a schematic diagram showing another structure of the driving board shown in FIG. 5.

As shown in FIG. 7, the display controller 312 includes a frame storage control circuit 3121, an image processing circuit 3122, a timing control circuit 3123, and a memory 3124. The driving chip 313 includes a scan driving circuit 3131 and a data driving circuit 3132. The frame storage control circuit 3121 is connected to the memory 3124; the central processing unit 311 is in communication with the frame storage control circuit 3121; the image processing circuit 3122 is connected to the frame storage control circuit 3121; the image processing circuit 3122 is connected to the timing control circuit 3123; and the timing control circuit 3123 is connected to the scan driving circuit 3131 and the data driving circuit 3132 through a scan control link. It will be understood that, traditional timing control circuits are only used to generate synchronization signals and cannot process video signals. However, with the development of display control technology, the timing control circuits currently used have integrated image processing function, so as to process video signals. It will be understood that, the scan driving circuit 3131 is connected to n gate lines GX shown in FIG. 4 (i.e. the first gate line GX1, the second gate line GX2, . . . , the nth gate line GXn), and the data driving circuit 3132 is connected to m signal lines SX shown in FIG. 4 (i.e. the first signal line SX1, the second signal line SX2, . . . , the mth signal line SXm).

As shown in FIGS. 6 and 7, during operation, the frame storage control circuit 3121 writes a debug signal of an image frame included in image information from the central processing unit 311 into the memory 3124, so that the image processing circuit 3122 can read the debug signal of the image frame from the memory 3124 through the frame storage control circuit 3121. After that, the frame storage control circuit 3121 writes a debug signal of a next image frame from the central processing unit 311 into the memory 3124. The image processing circuit 3122 decodes, scales, and renders the received debug signal of the image frame to obtain display data, and transmits the display data to the timing control circuit 3123. The timing control circuit 3123 performs gray-scale modulation on the display data, generates a synchronization signal, a clock signal, and a processed data signal, and sends the clock signal, the synchronization signal, and the processed data signal to the scan driving circuit 3131 and the data driving circuit 3132 through the scan control link, so that the display panel 200 displays the image frame under the control of the scan driving circuit 3131 and the data driving circuit 3132.

Figure 8:
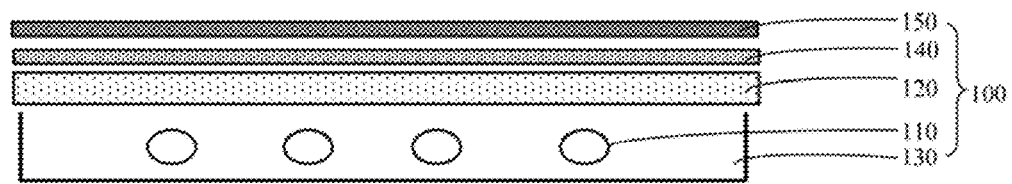
FIG. 8 is a schematic diagram showing a structure of a backlight module of the display apparatus shown in FIG. 1.

FIG. 8 is a schematic diagram showing a structure of a backlight module. As shown in FIG. 8, the backlight module 100 is a direct-lit backlight module, and includes light source 110, a reflective plate 130, a light guide plate 120, a diffusion plate 140, and a brightness enhancement film 150. The reflective plate 130 and the light source 110 are both located under the light guide plate 120, and the light source 110 is located between the reflective plate 130 and the light guide plate 120. The diffusion plate 140 is located on a side of the light guide plate 120 away from the light source 110, and the brightness enhancement film 150 is located on a side of the diffusion plate 140 away from the light guide plate 120. It will be understood that, in some backlight modules, the diffusion plate 140 can also have the function of the light guide plate 120 to reduce a thickness of the backlight module.

The light source 110 may be a planar light source or a dot matrix light source. The dot matrix light source includes a plurality of light-emitting devices. The light-emitting devices may be mini light-emitting diodes (Mini LEDs). At present, a backlight display technology using Mini LEDs as backlight has already come into being, and is called Mini LED backlight display technology.

With costs and circuit design taken into consideration, there should not be too many Mini LEDs in the backlight module using Mini LED backlight display technology. As a result, a distance between adjacent Mini LEDs is relatively large in a case where the backlight module has a large size or where the number of Mini LEDs is small. Consequently, after light emitted by the Mini LEDs is diffused through the diffusion plate, it is inevitable that problems of lamp shadows and halos, etc, will occur. In order to solve these problems, at present, a certain optical distance is reserved between the Mini LEDs and the diffusion plate. In this way, the problems of lamp shadows and halos may be alleviated. However, the thickness of the backlight module may increase significantly.

Figure 9:
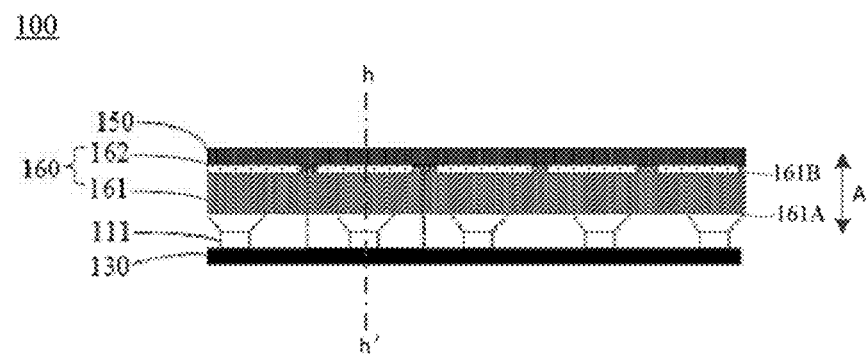
FIG. 9 is a schematic diagram showing a structure of a backlight module including an optical film, in accordance with some embodiments.

FIG. 9 shows a backlight module 100. The backlight module 100 includes the light source 110. The light source 110 may be a dot matrix light source, which includes at least one light-emitting device 111. The light-emitting device 111 may be a Mini LED. Of course, the light source 110 may also be of other types.

As shown in FIG. 9, the backlight module 100 further includes an optical film 160. The optical film 160 includes a light-transmissive substrate 161 and at least one first annular lens group 162 on the light-transmissive substrate 161. FIG. 9 shows an example in which the at least one light-emitting device 111 includes a plurality of light-emitting devices 111 and the at least one first annular lens group 162 includes a plurality of first annular lens groups 162.

As shown in FIG. 9, the light-transmissive substrate 161 has a first surface 161A and a second surface 161B that are disposed opposite to each other. The first surface 161A is a light inlet surface of the light-transmissive substrate 161, and the second surface 161B is a light exit surface of the light-transmissive substrate 161. The plurality of first annular lens groups 162 are disposed on the second surface 161B of the light-transmissive substrate 161. The plurality of light-emitting devices 111 are disposed at a side of the first surface 161A of the light-transmissive substrate 161.

As shown in FIG. 9, in some examples, a first annular lens group 162 corresponds to a light-emitting device 111. For example, an orthographic projection of each light-emitting device 111 on the first surface 161A is within an orthographic projection of a corresponding first annular lens group 162 of the optical film 160 on the first surface 161A.

The light-transmissive substrate 161 may be made of an ordinary glass material or an organic light-transmissive material, such as polymethyl methacrylate (PMMA), polystyrene (PS), polycarbonate (PC), OZ-1000 resin, or KT-153 spiro resin. The first annular lens group 162 may be made of a curable light-transmissive resin material, such as UV curable resin, epoxy resin, organic silicone resin, or melamine-formaldehyde resin.

Figure 10:
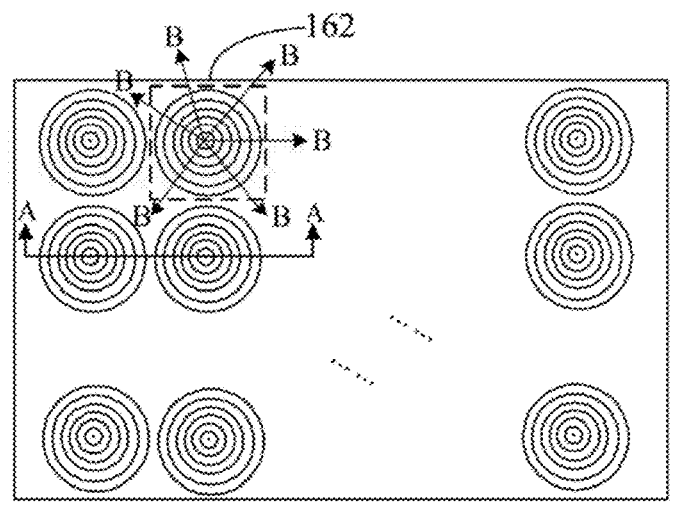
FIG. 10 is a schematic top view of the optical film shown in FIG. 9.

FIG. 10 is a schematic top view of the plurality of first annular lens groups 162. As shown in FIGS. 9 and 10, the reflectivity of the first annular lens group 162 decreases along a direction B away from the central axis hh' thereof. As shown in FIG. 9, the extending direction of the central axis hh' is the same as the thickness direction of the light-transmissive substrate 161, i.e., the direction shown by the arrow A.

The first annular lens group 162 may include one first annular lens or a plurality of first annular lenses 1620.

In some examples, the first annular lens group 162 includes one first annular lens, and the reflectivity of the first annular lens gradually decreases along the direction B away from the central axis hh' thereof. In this case, the central axis of the first annular lens group is the central axis of the first annular lens.

Figure 11:
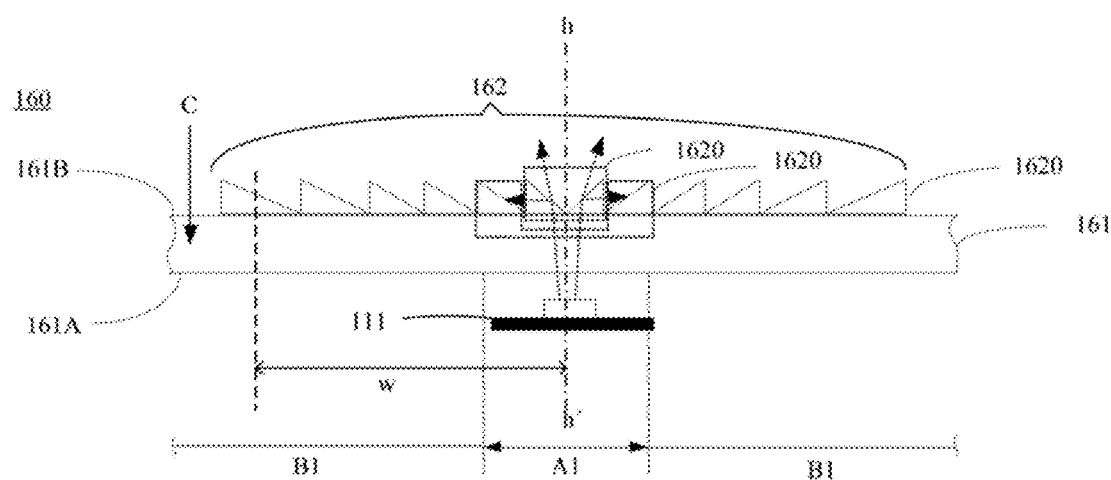
FIG. 11 is an enlarged schematic diagram of a structure in the dashed box shown in FIG. 10.

In some other examples, as shown in FIGS. 10 and 11, the first annular lens group 162 includes a plurality of first annular lenses 1620. The plurality of first annular lenses 1620 may be substantially concentric about the central axis hh', and arranged radially adjacent to one another. For example, as shown in FIGS. 10 and 11, the first annular lens group 162 includes six first annular lenses 1620 that are substantially concentric about the central axis hh', and the six first annular lenses 1620 are arranged adjacent to one another in the radial direction thereof.

Of course, the plurality of first annular lenses 1620 may be arranged radially adjacent to each other, but not concentric about a central axis hh'. In this case, the central axis of the first annular lens group 162 may be the central axis of the innermost first annular lens 1620.

It will be noted that, when light strikes the surface of a certain object, part of it is reflected and part of it is refracted. The term "reflectivity" in the embodiments of the present disclosure refers to the ratio of the energy of the light reflected by the surface of the object to the total energy of the light irradiated on the surface of the object, and is used to indicate the ability of the object to reflect the light. The greater the reflectivity, the stronger the ability of the object to reflect light. In some embodiments of the present disclosure, as shown in FIG. 11, the inner surface of the first annular lens 1620 included in the first annular lens group is a slope inclined with respect to the second surface 161B. It is easy to understand that, the inclination of the inclined surface is different, and the ability to reflect light is different, that is, the reflectivity of the first annular lens 1620 is different. Referring to FIG. 11, after the light irradiates the inner surface of the first annular lens 1620 through the light-transmissive substrate 161, part of it is reflected and part of it is refracted. Along the direction away from the central axis of the first annular lens group 162, the inclination of the first annular lens 1620 gradually decreases, and the reflecting abilities of the first annular lenses 1620 to light gradually decreases, that is, the reflectivity of the first annular lenses 1620 gradually decreases.

The following embodiments are described below by taking the plurality of first annular lenses 1620 being substantially concentric about the central axis hh' as an example. With regard to the situation in which the first annular lens group 162 is of other structure, reference may be made to related contents in the embodiments.

As shown in FIG. 11, since the plurality of first annular lenses 1620 in one first annular lens group 162 are arranged substantially concentrically, the central axis of each first annular lens 1620 in the first annular lens group 162 is the same, and the central axis of the first annular lens 1620 is also the central axis of the first annular lens group 162. In addition, the word "radially" means that the plurality of first annular lenses 162 are arranged in radial direction thereof. The radial direction may be the direction B shown in FIG. 10. It will be noted that, the first annular lens may be in a shape of a ring, as shown in FIG. 10, and the first annular lens may also be in a shape of an elliptical ring or a polygonal ring, for example, a triangular ring, a square ring, or a rectangular ring.

It will be noted that, an inner wall of each first annular lens 1620 is in a shape of a funnel. A narrow end of the funnel is closer to the second surface 161B than a wide end of the funnel. Different first annular lenses 1620 have different sizes at wide ends thereof, and have different sizes at narrow ends thereof, so that the plurality of first annular lenses 1620 can be arranged in the radial direction in sequence. The size of each first annular lens 1620 and sizes of the wide and narrow ends of each first annular lens 1620 are not limited, as long as the plurality of first annular lenses 1620 can be sequentially arranged. For example, as shown in FIG. 11, the minimum inner diameter of the first annular lens 1620 may be zero.

As shown in FIGS. 9 and 11, a geometrical center of the light-emitting device 111 is generally close to the central axis hh' of a corresponding first annular lens group 162. Therefore, the closer to the central axis hh' of the first annular lens group 162, the greater the density of light. The first annular lens group 162 may be able to reflect light close to the central axis hh' of the first lens group 162 (that is, light corresponding to a region with higher brightness) to regions on which less or no light is incident (the dotted lines with arrows in FIG. 11 are optical paths), so that the regions on which less or no light is incident are also somewhat bright.

It will be noted that, the light propagation process described above happens inside the optical film 160. Therefore, a uniformity of emergent light rays of the optical film 160 may be effectively improved, and the optical film 160 may have a good light-uniform effect. In this way, it may be possible to alleviate the lamp shadows and halos, etc. caused by a poor light-uniform effect of existing diffusion plate. When applied to a backlight module, the optical film 160 may be able to replace the diffusion plate to diffuse and uniform the light emitted by the at least one light-emitting device 111. Therefore, in addition to alleviating lamp shadows and halos, etc., the optical film 160 shown in FIG. 9 may also reduce the thickness of the backlight module.

In the embodiments of the present disclosure, the number and positions of the light-emitting devices 111 and the first annular lens groups 162 may be in one-to-one correspondence. For example, the number of the light-emitting devices 111 is the same as the number of the first annular lens groups 162, the light-emitting devices 111 are arranged in a dot matrix, and the first annular lens groups 162 are also arranged in the dot matrix. In some other examples, the number and positions of the light-emitting devices 111 and the first annular lens groups 162 may not be in one-to-one correspondence. For example, the number of the first annular lens groups 162 may be less than the number of the light-emitting devices 111. That is, for some light-emitting devices 111, there may not be corresponding first annular lens groups 162. In addition, positions of some light-emitting devices 111 may not correspond to positions of corresponding first annular lens groups 162. For example, a geometrical center of the light-emitting device 111 does not coincide with the central axis of the first annular lens group 162.

In order to ensure that the reflectivity of the plurality of first annular lenses 1620 decreases along a direction away from the central axis thereof, in some embodiments, as shown in FIG. 11, a distance between an inner surface of each first annular lens 1620 and its central axis in the radial direction of the first annular lens 1620 decreases along a direction C that is parallel to the central axial hh' and points toward the second surface 160B, and angles each between a tangent plane of an inner surface of a corresponding first annular lens 1620 in the plurality of first annular lenses 1620 and the second surface 161B are acute angles and decrease in the direction away from the central axis hh' of the plurality of first annular lenses 1620.

It will be noted that the tangent plane of the inner surface refers to a tangent plane of the inner surface at the intersection of the inner surface and the second surface 161B. As shown in FIG. 12D, the inner surface 1620A and the second surface 161B intersect at position c, and the tangent plane of the inner surface 1620A at position c, i.e., plane P, is the tangent plane of the inner surface 1620A.

As shown in FIG. 11, taking the outermost first annular lens 1620 as an example, the distance between an inner surface of the outermost first annular lens 1620 and its central axis in the radial direction of the outermost first annular lens 1620 is represented by w in FIG. 11.

The tangent value of the angle between the tangent plane of the inner surface of the first annular lens 1620 and the second surface 161B may be defined as the slope of the inner surface of the first annular lens 1620. For example, as shown in FIGS. 12A to 12D, the angle between a tangent plane of the inner surface of a first annular lens 1620 and the second surface 161B may be $\alpha$, and the slope of the inner surface of the first annular lens 1620 is defined as: k=tg $\alpha$. It can be seen that as k increases, $\alpha$ increases.

Along the direction away from the central axis hh', the angles each between the inner surface of a corresponding first annular lens 1620 in the plurality of first annular lens 1620 and the second surface 161B decrease from the center of the first annular lens group 162 outward. That is, an angle between the second surface 161B and an inner surface of a first annular lens 1620 located at the central axis hh' of the first annular lens group 162 is the largest, and an angle between the second surface 161B and an inner surface of a first annular lens 1620 furthest away from the central axis hh' of the first annular lens group 162 is the smallest.

When light travels from the light-transmissive substrate 161 toward each first annular lens 1620, a first annular lens 1620 with a larger angle $\alpha$ has larger reflectivity, and a first annular lens 1620 with a smaller angle $\alpha$ has smaller reflectivity. Therefore, as shown in FIG. 11, among the plurality of first annular lenses 1620, first annular lenses 1620 closer to the central axis hh' have larger reflectivity, and first annular lenses 1620 further away from the central axis hh' have smaller reflectivity. In this way, it may be possible to ensure that the reflectivity of the first annular lenses 1620 decreases along the direction away from the central axis hh'.

On the basis of the above analysis, as shown in FIG. 11, in the optical film 160, each first annular lens group 162 can reflect the light proximate to the central axis hh' of the first annular lens group 162 to regions on which less or no light is incident. In this way, it may be possible to ensure that the optical film 160 has a good light-uniform performance, and thus the problems of lamp shadows and halos may be alleviated.

In some examples, as shown in FIG. 11, the angles each between the tangent plane of the inner surface of the corresponding first annular lens 1620 in the plurality of first annular lenses 1620 and the second surface 161B are different from each other. That is, the angles each between the tangent plane of the inner surface of the corresponding first annular lens 1620 in the plurality of first annular lenses 1620 and the second surface 161B gradually decrease in the direction away from the central axis. In some other examples, some of the angles each between the tangent plane of the inner surface of the corresponding first annular lens 1620 in the plurality of first annular lenses 1620 and the second surface 161B are the same.

In some embodiments, as shown in FIGS. 12A to 12D, each of intersecting lines of the inner surface of the first annular lens 1620 and a plane passing through the central axis hh' includes at least one of at least one straight line segment or at least one curved line segment.

Figure 12A:
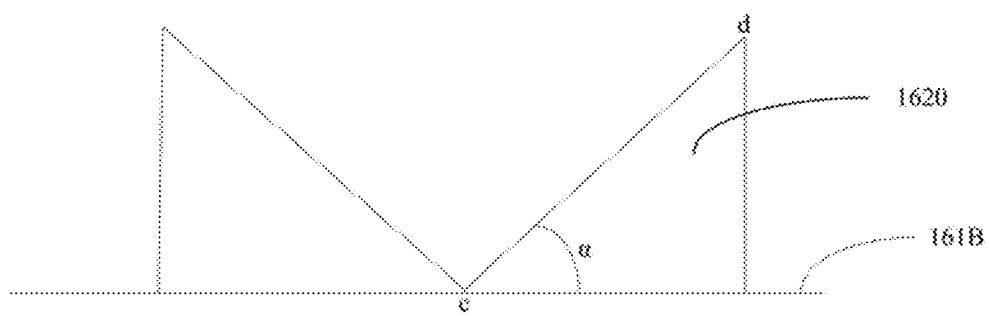
FIG. 12A is a schematic diagram showing a structure of a first annular lens, in accordance with some embodiments.

In some examples, as shown in FIG. 12A, the at least one straight line segment includes a straight line segment that is continuously inclined with respect to the second surface 161B. In this case, the angle between the second surface 1618 and the tangent plane of the inner surface is the angle between the second surface 161B and the straight line segment that is continuously inclined with respect to the second surface 1618, i.e., the straight line segment cd in FIG. 12A.

Figure 12B:
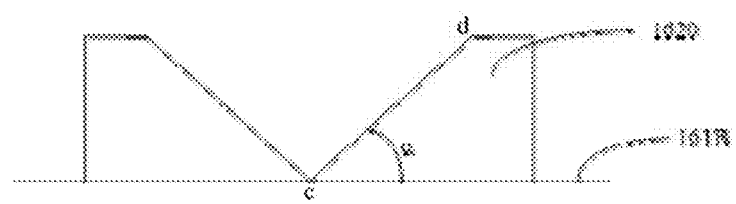
FIG. 12B is a schematic diagram showing a structure of another first annular lens, in accordance with some embodiments.
Figure 12C:
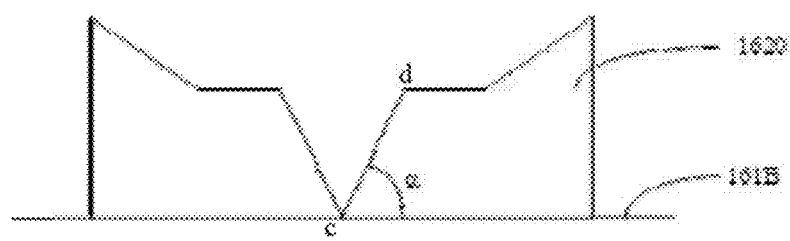
FIG. 12C is a schematic diagram showing a structure of yet another first annular lens, in accordance with some embodiments.
Figure 12D:
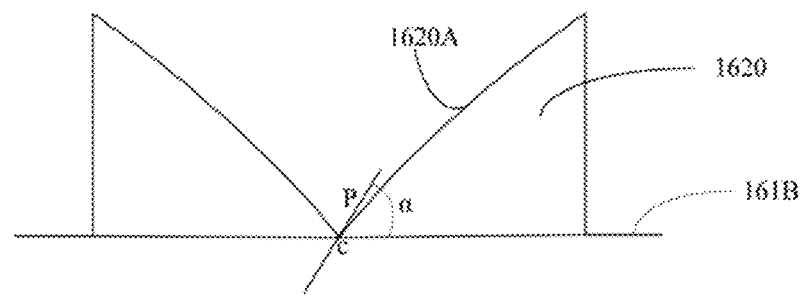
FIG. 12D is a schematic diagram showing a structure of yet another first annular lens, in accordance with some embodiments.

In some other examples, as shown in FIGS. 12B and 12C, the at least one straight line segment includes straight line segments that are connected in a stepped shape and intermittently inclined with respect to the second surface 161B. For example, as shown in FIG. 12B, the at least one straight line segment includes two straight line segments that are connected in a stepped shape, and one straight line segment is inclined with respect to the second surface 161B. In this case, the angle between the second surface 1618 and the tangent plane of the inner surface is the angle between the second surface 161B and the inclined straight line segment, i.e., the straight line segment cd in FIG. 12B. For another example, as shown in FIG. 12C, the at least one straight line segment includes three straight line segments that are connected in anther stepped shape, and two straight line segments are inclined with respect to the second surface 161B at different angles. In this case, the angle between the second surface 161B and the tangent plane of the inner surface is the angle between the second surface 161B and the inclined straight line segment adjacent to the second surface 161B, i.e., the straight line segment cd in FIG. 12C.

In some other examples, as shown in FIG. 12D, the at least one curved line segment includes a curved line segment that is continuously inclined with respect to the second surface 161B. In this case, the angle between the second surface 161B and the tangent plane of the inner surface is the angel between the second surface 161B and the tangent line of the curved line segment at the intersection of the second surface 1618 and the curved line segment, i.e., the angel α between the second surface 161B and the tangent line P of the inner surface 1620A at position c.

Figure 12E:
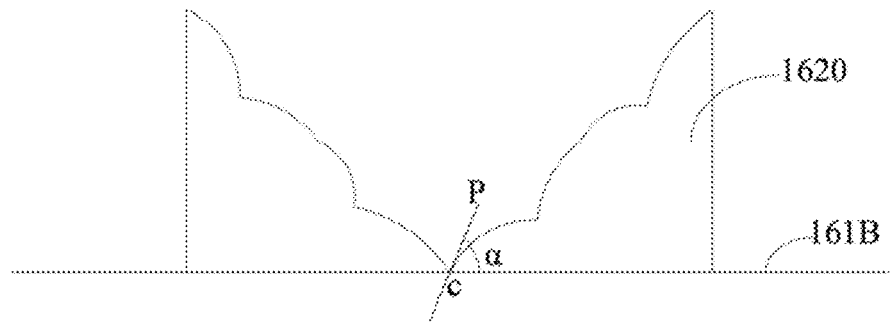
FIG. 12E is a schematic diagram showing a structure of yet another first annular lens, in accordance with some embodiments.

Of course, the at least one curved line segment may also include a plurality of curved line segments that are connected in another stepped shape and intermittently inclined with respect to the second surface 161B. For example, as shown in FIG. 12E, the at least one curved line segment includes curved line segments that are connected in anther stepped shape. In this case, the angle between the second surface 161B and the tangent plane of the inner surface is the angel between the second surface 161B and the tangent line of the curved line segment adjacent to the second surface 1618 at the intersection of the second surface 161B and the curved line segment, i.e., the angel α between the second surface 161B and the tangent line P of the inner surface at position c.

In some embodiments, the dot matrix light source includes a plurality of light-emitting devices 111 arranged in an array.

If density of orthographic projections of the light-emitting devices 111 on the first surface 161A is relatively small (that is, density of the light-emitting devices 111 is relatively small), as shown in FIG. 11, then for each light-emitting device 111 on the first surface 161A, the first surface 161A may have alight coverage region A1 and a non-light coverage region B1 surrounding the light coverage region A1. The light coverage region A1 refers to a region where an orthographic projection of the light-emitting device 111 on the first surface 161A is located, and the non-light coverage region B1 refers to a region arranged along the circumference of the light coverage region A1. That is, the first surface 161A of the light-transmissive substrate 161 of the optical film 160 has light coverage regions A1 and non-light coverage regions B1 each surrounding a corresponding light coverage region A1, and the orthographic projection of a first annular lens group 162 on the first surface 161A covers a corresponding light coverage region A1 and a non-light coverage region B1 surrounding the corresponding light coverage region a.

On this basis, when light emitted by the light-emitting device 111 passes through the light coverage region A1 and incident on the first annular lens group 162, a portion of the light may be reflected by the first annular lens group 162 to the non-light coverage region B1 and exit from the non-light coverage region B1. In this way, it may be possible to ensure that there is also light exiting from the non-light coverage region B1 (as for optical paths, reference may be made to the dotted lines with arrows in FIG. 11), thereby alleviating the problems of lamp shadows and halos, etc.

It will be noted that, a structure of the first annular lens group 162 shown in FIG. 11 is relatively similar to that of the Fresnel lens, but there are also differences. For example, the existing Fresnel lens is formed by cutting a spherical or an aspheric lens in sections; and in terms of structure, a slope of the Fresnel lens is small at a center and large on edges. However, in some embodiments of the present disclosure, in terms of structure, the slope of each first annular lens group 162 is large at the center and small on edges. It can be seen that in the optical film 160 provided by some embodiments of the present disclosure, although the structure of the first annular lens group 162 is similar to that of the Fresnel lens, considering the application scenarios and under the premise that the optical film 160 may alleviate the problems of lamp shadows and halos, the first annular lens group 162 provided in some embodiments of the present disclosure cannot be replaced with the existing Fresnel lens. From the analysis of the light transmittance of the first annular lens group 162 by using the Fresnel equations, it can be seen that the first annular lens group 162 can allow a portion of light exiting from the second surface 161B perpendicularly to pass through, and a part of light exiting from the second surface 161B at a certain angle may be reflected by the inner surfaces of the plurality of first annular lenses 1620 included in the first annular lens group 162.

Figure 13:
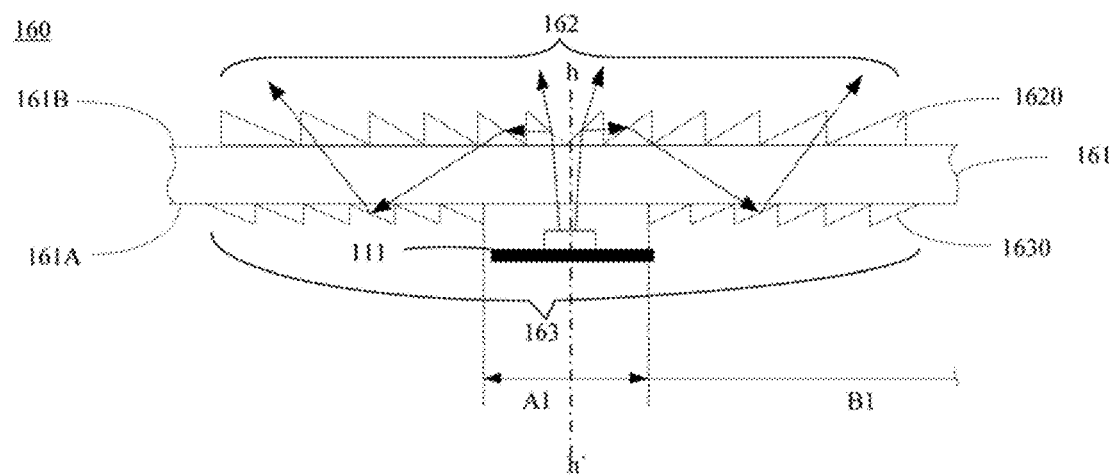
FIG. 13 is a schematic diagram showing a structure of another optical film, in accordance with some embodiments.
Figure 14A:
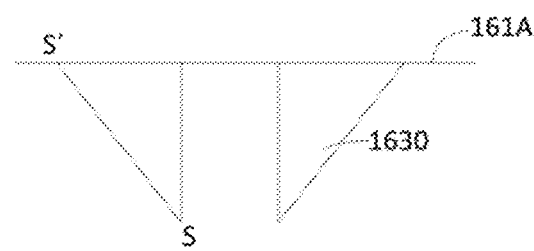
FIG. 14A is a schematic diagram showing a structure of a second annular lens, in accordance with some embodiments.
Figure 14B:
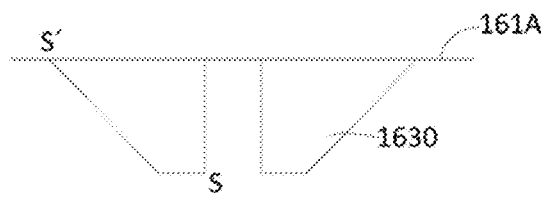
FIG. 14B is a schematic diagram showing a structure of another second annular lens, in accordance with some embodiments.
Figure 14C:
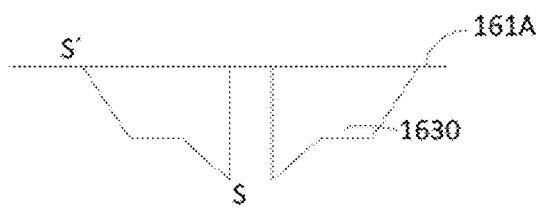
FIG. 14C is a schematic diagram showing a structure of yet another second annular lens, in accordance with some embodiments.
Figure 14D:
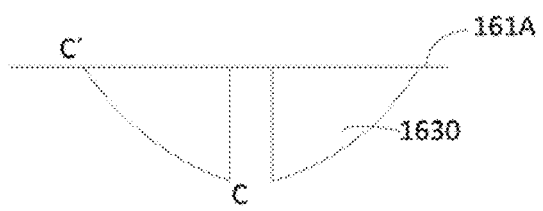
FIG. 14D is a schematic diagram showing a structure of yet another second annular lens, in accordance with some embodiments.
Figure 14E:
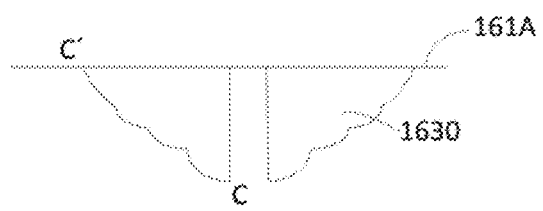
FIG. 14E is a schematic diagram showing a structure of yet another second annular lens, in accordance with some embodiments.

In some embodiments, in order to increase a light exit rate, as shown in FIG. 13, the optical film 160 further includes at least one second annular lens group 163 disposed on the first surface 161A. The second annular lens group 162 is disposed in a corresponding non-light coverage region B1, and is configured to reflect light.

In some embodiments, as shown in FIG. 13, similar to the first annular lens group 162, the second annular lens group 162 includes a plurality of second annular lenses 1630 arranged radially adjacent to one another.

The second annular lens group may be made of a curable light-transmissive resin material, such as UV curable resin, epoxy resin, organic silicone resin, or melamine-formaldehyde resin.

For example, the plurality of second annular lenses 1630 may be reflective lenses, and a first annular lens group 162 corresponds to a second annular lens group 162. As shown in FIG. 13, the second annular lens group is used to reflect light exiting from the light-transmissive substrate 161, so that the light can exit from the second surface 161B of the optical film 160 (as for optical paths, reference can be made to the dotted lines with arrows in FIG. 13). In this way, it may be possible to avoid loss of light and improve the light exit rate.

In a case where the second annular lens group reflects the light exiting from the light-transmissive substrate 161 to the non-light coverage region B1, it may also be possible to increase an amount of light exiting from the non-light coverage region B1 where lamp shadows and halos are prone to appear. In this way, it may be possible to further alleviate the problems of lamp shadows and halos.

In addition, after the light reflected by the first annular lens group 162 enters the light-transmissive substrate 161, a corresponding second annular lens group can also reflect the light exiting from the light-transmissive substrate 161 toward a position proximate to the central axis hh' of the first annular lens group 162. In this way, it may be possible to avoid a problem of light mixing between two adjacent light-emitting devices 111 in the dot matrix light source caused by too wide diffusion of light, and thereby improving the local dimming performance of the dot matrix light source.

As can be seen from the above, as shown in FIG. 13, in the optical film 160, the second surface 161B of the light-transmissive substrate 161 is provided with the first annular lens groups 162, and the first surface 161A is provided with the second annular lens groups 163 each located in a corresponding non-light coverage region B1. On this basis, the optical film 160 may be able to effectively solve a contradiction between the light mixing of the dot matrix light source and the halo problem. As a result, on the premise of avoiding lamp shadows and halos, a light-emitting device 111 may only illuminate one region to some extent, thereby solving the problem of light mixing, etc.

The structure of the second annular lens group is not limited, as long as the second annular lens group can reflect the light traveling from the light-transmissive substrate 161 toward the first surface 161A to the second surface 161B. In some examples, the second annular lens group 163 may be a conventional Fresnel lens, or a lens of other structures. For example, as shown in FIG. 13, the second annular lens group 163 includes a plurality of second annular lenses 1630 arranged radially adjacent to one another. The plurality of second annular lenses 1630 may be substantially concentric about a central axis, for example, of the first annular lens group 162, or may be arranged about different axes.

In some embodiments, a distance between an outer surface of each second annular lens and its central axis (i.e. the central axis hh' in FIG. 13) in a radial direction of the second annular lens 1630 increases along a direction that is parallel to the central axis hh' and points toward the first surface 161A.

In this case, the light traveling through the light-transmissive substrate 161 to the non-light coverage region 1 will be reflected by the second annular lens 1630, so that the light will exit from the second surface 161B. In this way, it may be possible to further alleviate the problems of lamp shadows and halos. Of course, through cooperation of the second annular lens group 163 and the first annular lens group 162, it may also be possible to alleviate the problem of light mixing. As for a principle thereof, reference may be made to the foregoing description, and details will not be repeated here.

It will be understood that, although the second annular lens group 163 is capable of both reflecting and transmitting light, the plurality of second annular lenses 1630 included in the second annular lens group may be able to ensure that the light incident from the light-transmissive substrate 161 on the first surface 161A can only be reflected and cannot pass through the light-transmissive substrate 161.

In some embodiments, the angles each between the first surface 161A and a tangent plane of an outer surface of a corresponding second annular lens 1630 in the plurality of second annular lenses 1630 are the same.

In some other embodiments, the angles each between the first surface 161A and the tangent plane of the outer surface of the corresponding second annular lens 1630 in the plurality of second annular lenses 1630 are different from each other. In some examples, the plurality of second annular lens 1630 are arranged coaxially, and as shown in FIG. 13, reflectivity of the plurality of second annular lens 1630 gradually decreases along a direction away from the central axis thereof (the axis substantially coincides with the axis of the plurality of first annular lenses 1620).

For example, the outer surfaces of the plurality of second annular lenses 1630 are inclined surfaces as shown in FIG. 13, and it means that degrees of inclination of the outer surfaces of the plurality of second annular lenses 1630 gradually decrease along the direction away from the central axis of the plurality of second annular lenses 1630. In order to ensure that the reflectivity of the plurality of second annular lenses 1630 gradually decrease along the direction away from the central axis of the plurality of second annular lenses 1630, the angles each between the first surface 161A and a tangent plane of an outer surface of a corresponding second annular lens in the plurality of second annular lenses 1630 gradually decrease in the direction away from the central axis of the plurality of second annular lenses 1630.

In some embodiments, each of intersecting lines of the outer surface of the second annular lens 1630 and a plane passing through the central axis includes at least one of at least one straight line segment or at least one curved line segment.

In some examples, as shown in FIGS. 14A to 14E, the at least one straight line segment SS' includes a straight line segment that is continuously inclined with respect to the first surface 161A or straight line segments that are connected in a stepped shape and intermittently inclined with respect to the first surface 161A. The at least one curved line segment CC' includes a curved line segment that is continuously inclined with respective to the first surface 161A or curved line segments that are connected in another stepped shape and intermittently inclined with respect to the first surface 161A. With respect to the structure of the second annular lens, reference may be made to the description with reference to FIGS. 12A to 12E.

In some embodiments, as shown in FIG. 13, refractive index of a material of each first annular lens group 162 is greater than refractive index of air. In this way, it may be ensured that refractive index of the first annular lens group 162 is greater than the refractive index of air, so that the light incident on the first annular lens group 162 is more likely to be reflected, and the problems of lamp shadows and halos may be further alleviated.

In some embodiments, refractive index of a material of each second annular lens group 163 is greater than the refractive index of air. In this way, it may be ensured that refractive index of the second annular lens group 163 is greater than the refractive index of air, so that the light incident on the second annular lens group 163 is more likely to be reflected. As a result, it may be possible to improve the light exit rate of the non-light coverage region corresponding to the second surface 161B, and lower a probability of light mixing.

Figure 15:
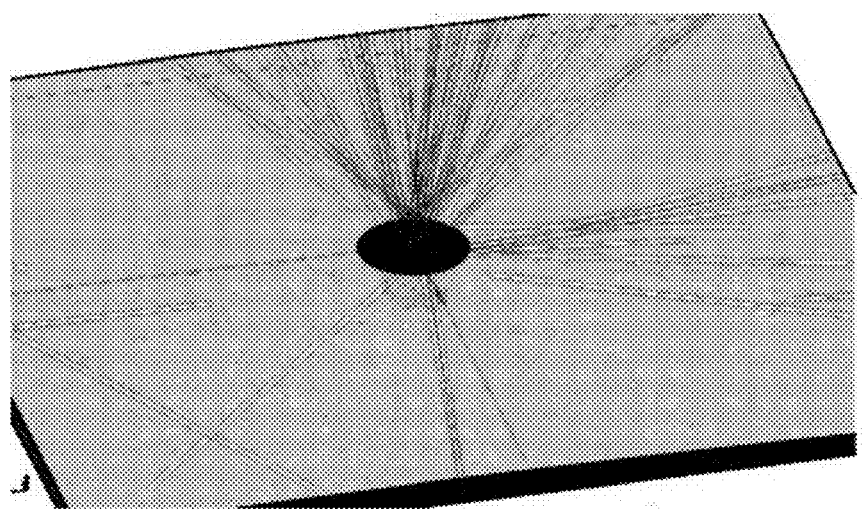
FIG. 15 is an optical simulation diagram of an optical film, in accordance with some embodiments.
Figure 16:
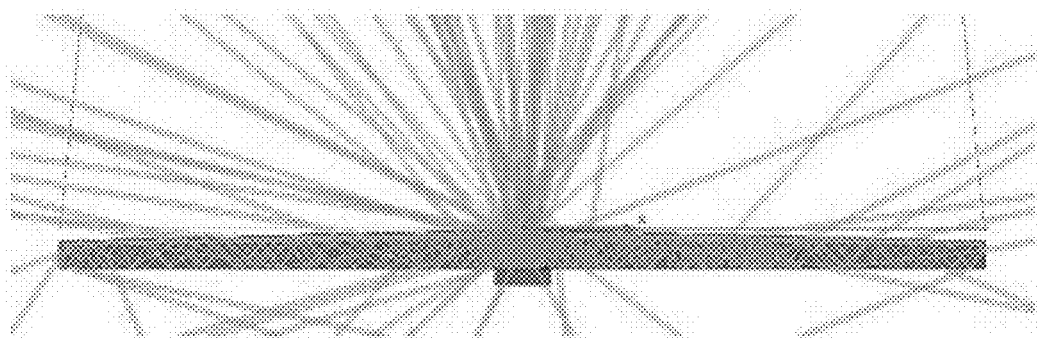
FIG. 16 is an optical simulation diagram of another optical film, in accordance with some embodiments.

FIG. 15 is an optical simulation diagram of an optical film including a first annular lens group. As shown in FIG. 15, the first annular lens group included in the optical film can diffuse light in all directions. FIG. 16 is an optical simulation diagram of an optical film including a first annular lens group and a second annular lens group. As shown in FIG. 16, the first annular lens group can diffuse light in all directions.

In order to prove an influence of the number of first annular lenses 1620 included in the first annular lens group 162 shown in FIG. 11 on an optical performance of the optical film 160 shown in FIG. 9, test results of the optical performance of the optical film are shown in Table 1. The number of lenses in Table 1 refers to the number of the plurality of first annular lenses included in one first annular lens group.

TABLE 1

Test results of optical performance of the optical film

| Number/pcs | Incident luminous flux [lm] | One-time transmission luminous flux [lm] | One-time transmission luminous ratio [%] |
|---|---|---|---|
| 7 | 91.7 | 54.65 | 59.6 |
| 14 | 91.82 | 52.45 | 57.1 |
| 27 | 91.57 | 47.22 | 51.6 |
| 54 | 91.48 | 47.89 | 51.8 |

Luminous flux refers to the intensity of light that arrives, leaves, or passes through an object per unit time. The unit is "lumen" and the symbol is lm. The incident luminous flux refers to the luminous flux of the light emitted by the light-emitting device entering the optical film; the one-time transmission luminous flux refers to the luminous flux of the light transmitted by the light coverage region A1 corresponding to regions where the optical film and the light-emitting device are located; and the one-time transmission luminous ratio refers to the ratio of the incident luminous flux to the one-time transmission luminous flux. If the one-time transmission ratio is relatively low, there will be less light directly passing through the optical film 160 and more light propagating inside the optical film 160, which is more conducive to achieving a better light-uniform effect of the optical film 160.

As can be seen from Table 1, when the number of the first annular lenses 1620 included in the first annular lens group 162 reaches 27, the one-time transmission ratio is reduced to 51.6% (which may be further reduced in a case where the structure of the first annular lenses 1620 included in the annular lens group 162 is continuously adjusted), and the remaining 48.4% of light will be diffused to all sides inside the optical film 160. Therefore, the optical film 160 has a good light-uniform effect. In addition, a part of the light diffused to all sides will enter the second annular lens group 163 from the light-transmissive substrate 161, and will eventually be reflected by the second annular lens group 163 to the second surface 1618, thereby increasing the light exit rate of the second surface 161B. Therefore, the optical film 160 may also be capable of avoiding the problem of light mixing between two adjacent light-emitting devices 111 in the dot matrix light source caused by too wide diffusion of light. As for the principle thereof, reference may be made to the foregoing description, and details will not be repeated here.

Figure 17:
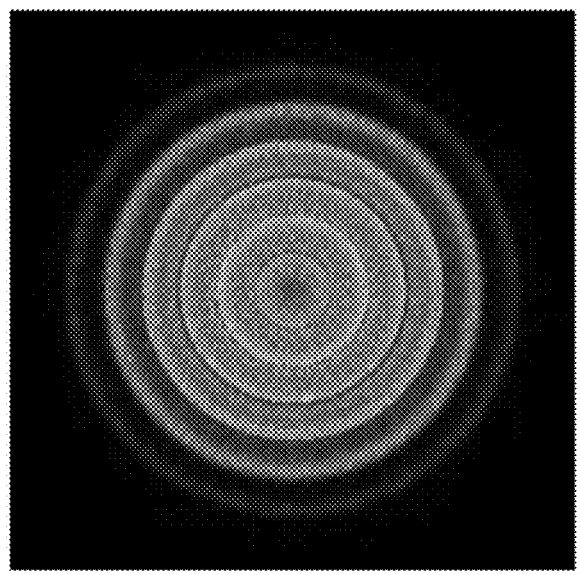
FIG. 17 is an optical simulation diagram of an optical film shown in FIG. 11 in a case where the number of first annular lenses is 7.
Figure 18:
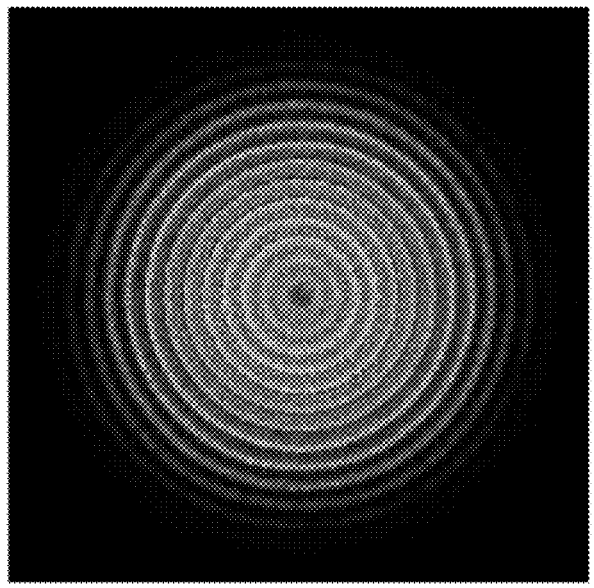
FIG. 18 is an optical simulation diagram of the optical film shown in FIG. 11 in a case where the number of first annular lenses is 14.
Figure 19:
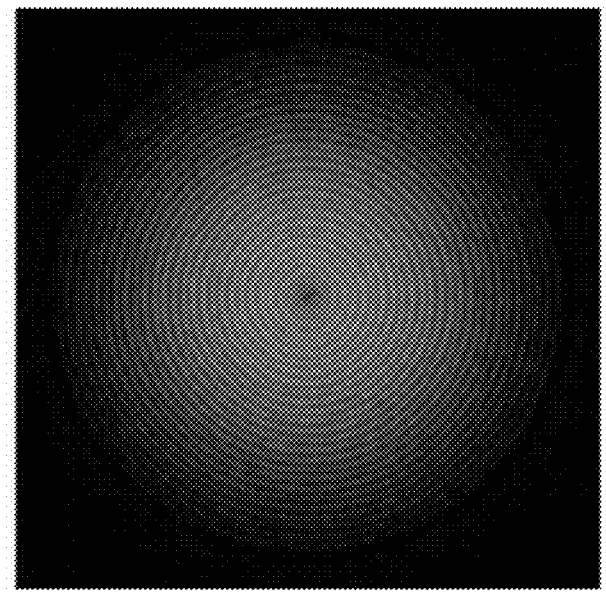
FIG. 19 is an optical simulation diagram of the optical film shown in FIG. 11 in a case where the number of first annular lenses is 27.
Figure 20:
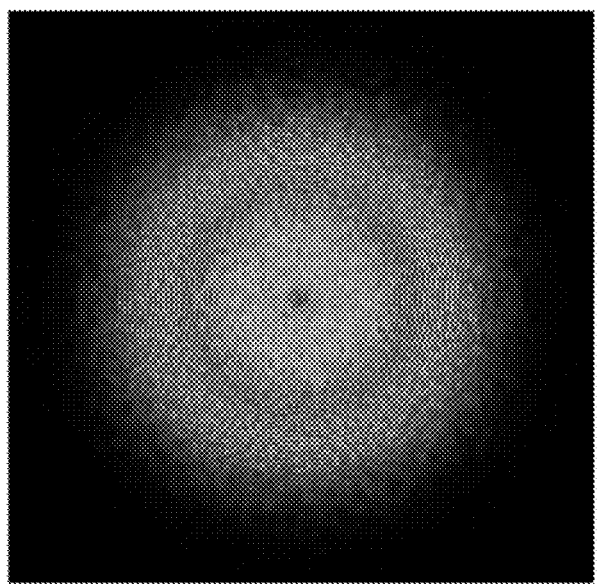
FIG. 20 is an optical simulation diagram of the optical film shown in FIG. 11 in a case where the number of first annular lenses is 54.
Figure 21:
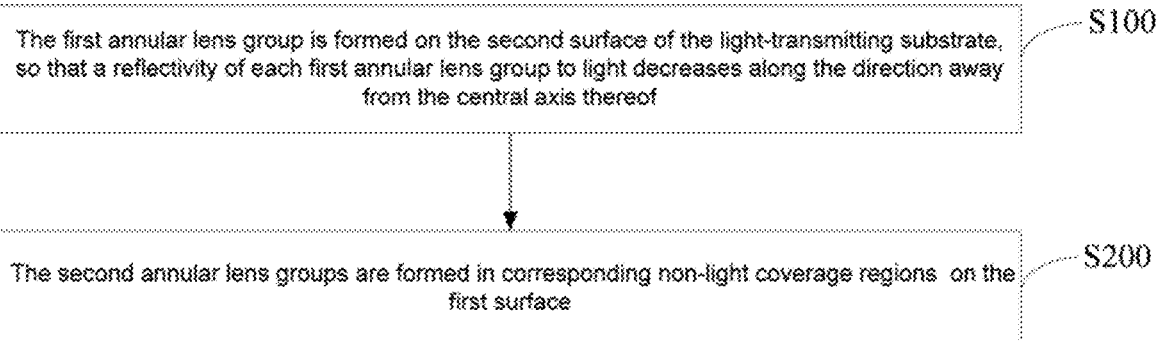
FIG. 21 is a flow chart of a method of manufacturing an optical film, in accordance with some embodiments.

FIG. 17 is an optical simulation diagram of an optical film in a case where the number of first annular lenses is 7; FIG. 18 is an optical simulation diagram of an optical film in a case where the number of first annular lenses is 14; FIG. 19 is an optical simulation diagram of an optical film in a case where the number of first annular lenses is 27; and FIG. 20 is an optical simulation diagram of an optical film in a case where the number of first annular lenses is 54. By comparing FIGS. 16 to 19, it can be found that the greater the number of first annular lenses, the better the light-uniform effect.

It will be noted that, in a case where the light-transmissive substrate 161 is provided with the second annular lens groups 163, the number and size of the second annular lenses included in the second annular lens group 163 are not limited, as long as the second annular lens groups 163 can increase the light exit rate of the second surface 1618.

In some embodiments, as shown in FIG. 9, in order to further improve a brightness of emergent light rays of backlight, the backlight module 100 further includes a reflective plate 130 disposed at a side of the light-emitting device 111 away from the first surface 161. The light-emitting devices 111 are located between the reflective plate 130 and the first surface 161A. The reflective plate 130 is capable of reflecting light that exits from the first surface 161 but is not reflected by the second annular lens group 163, thereby further improving the brightness of emergent light rays.

In some embodiments, as shown in FIG. 9, the backlight module further. Includes a brightness enhancement film 150 disposed at a side of the first annular lens groups 162 away from the light-transmissive substrate 161. The first annular lens groups 162 are disposed between the brightness enhancement film 150 and the second surface 161B. On this basis, the brightness of the emergent light rays provided by the backlight module may be further increased.

Some embodiments of the present disclosure provide a method of manufacturing the optical film. As shown in FIGS. 11 and 23C, the method of manufacturing the optical film includes step 100 (S100).

In S100, the first annular lens group 162 is formed on the second surface 161B of the light-transmissive substrate 161, so that the reflectivity of the first annular lens group decreases along the direction away from the central axis thereof.

The light-transmissive substrate 161 includes the first surface 161A and the second surface 161B that are disposed opposite to each other. The first surface 161A is configured as a light inlet surface, and the second surface 161B is configured as a light exit surface. The light-transmissive substrate 161 may be made of an ordinary glass material, or an organic light-transmissive material. Through the above step, an optical film having a plurality of first annular lens groups 162 may be obtained. The first annular lens group 162 includes a plurality of first annular lenses 1620. The plurality of first annular lenses 1620 are substantially concentric about a central axis hh' and are arranged radially adjacent to one another. The extending direction of the central axis hh' is the same as the thickness direction of the light-transmissive substrate 161.

The beneficial effects of the method of manufacturing the optical film provided by some embodiments of the present disclosure are the same as the beneficial effects of the optical film 160 described above, and details will not be repeated here.

In some embodiments, the step of forming the first annular lens group 162 on the second surface 161B may be realized by adopting one of the following two methods.

The first method is to form the first annular lens group on the second surface through an etching process.

The etching may be a dry etching process, or a wet etching process, etc. The inner surface of each first annular lens in the first annular lens group 162 may be formed through multiple etchings by providing a shielding element, such as a mask, above the second surface 161B.

Figure 22:
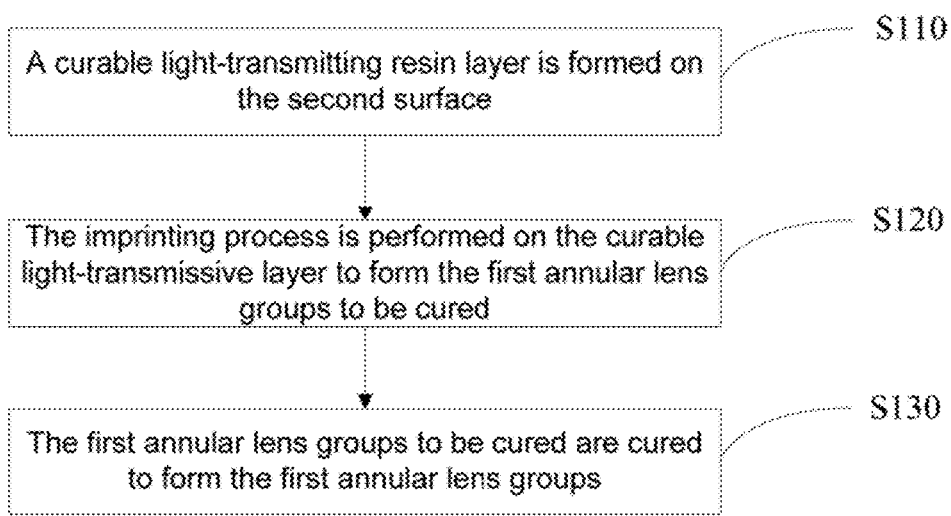
FIG. 22 is another flow chart of a method of manufacturing an optical film, in accordance with some embodiments.

The second method is to form the first annular lens groups 162 on the second surface 161B through an imprinting process. As shown in FIG. 22, the second method includes steps 110, 120 and 130 (S110 to S130), as described below.

Figure 23A:
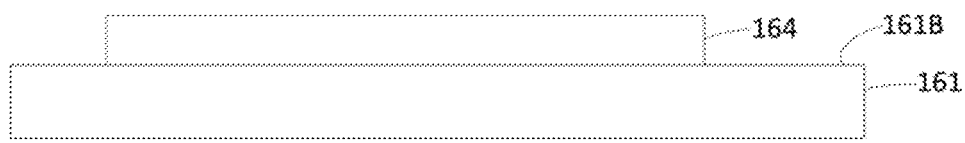
FIG. 23A is a diagram showing a step of forming a curable light-transmissive resin layer, in accordance with some embodiments.

In S110, as shown in FIG. 23A, a curable light-transmissive resin layer 164 is formed on the second surface 161B.

Figure 23B:
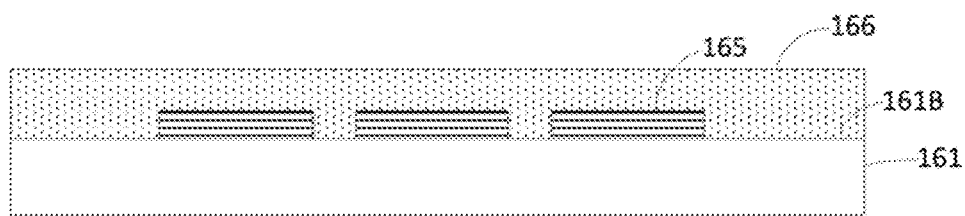
FIG. 23B is a diagram of an imprinting process, in accordance with some embodiments.
Figure 23C:
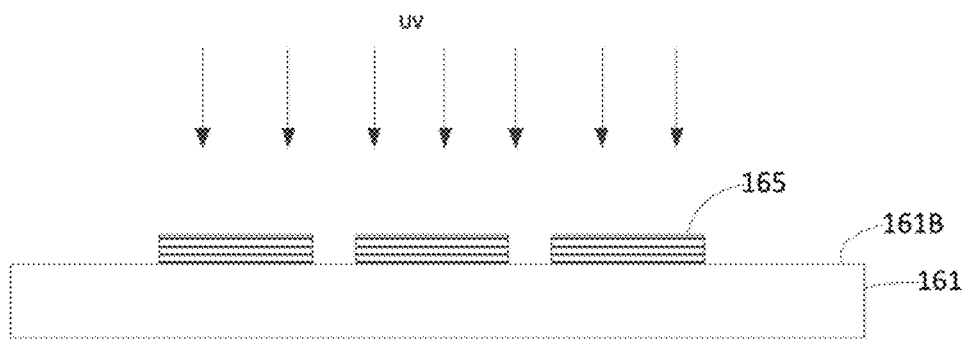
FIG. 23C is a diagram of a curing process, in accordance with some embodiments.

In S120, as shown in FIG. 23B, the imprinting process is performed on the curable light-transmissive resin layer 164 to form first annular lens groups to be cured 165.

For example, first annular lens groups to be cured 165 may be formed by imprinting the curable light-transmissive resin layer 164 with a template 166.

In S130, as shown in FIG. 238, the first annular lens groups to be cured 165 are cured to form the first annular lens groups 162.

For example, Ultraviolet (UV) curing method may be used to cure the first annular lens groups to be cured 165 to form the first annular lens groups 162.

A curing method may be selected according to a type of curable light-transmissive resin contained in the curable light-transmissive resin layer. For example, if the curable light-transmissive resin is a UV-light curing light-transmissive resin, then the first annular lens groups to be cured are cured through exposure of UV light. If the curable light-transmissive resin is a thermo-curing light-transmissive resin, then the first annular lens groups to be cured will be cured by heating.

In some embodiments, as shown in FIGS. 11 and 20, in a case where the first surface 161A has light coverage regions A1 and non-light coverage regions 61 each surrounding a corresponding light coverage region A1, the method of manufacturing the optical film 160 further includes step 200 (S200).

In S200, the second annular lens groups 163 are formed in corresponding non-light coverage regions 1 on the first surface 161A.

It will be noted that, the orthographic projection of each first annular lens group 162 on the first surface 161A covers a corresponding light coverage region A1 and a non-light coverage region B1 surrounding the corresponding light coverage region A1.

As for a specific structure of the second annular lens group 163, reference may be made to the foregoing description, and details will not be repeated here.

It will be understood that, an order of steps S100 and S200 are not limited and can be determined according to the actual situation. In some embodiments, the method of manufacturing the optical film may not include S200.

Regarding the step of forming the second annular lens groups 163 in corresponding non-light coverage regions B1, reference may be made to the step of forming the first annular lens groups 162 on the second surface 1618 described above, and details will not be repeated here.

In some embodiments of the present disclosure, as shown in FIGS. 9 and 11, the backlight module includes light-emitting devices 111, and the optical film 160 described above. The light-emitting devices 111 is disposed at the first surface 161A of the light-transmissive substrate 161. The orthographic projection of the light-emitting device 111 on the first surface 161A is within the orthographic projection of a corresponding first annular lens group 162 on the first surface 161A. This may ensure that the light emitted by the at least one light-emitting device 111 can be reflected by the first annular lens group 162 to regions with no light or less light as much as possible, and thereby alleviating the problems of lamp shadows and halos, etc.

It will be understood that, the orthographic projection of each first annular lens group 162 on the first surface 161A may be able to cover the orthographic projection of a respective one of the plurality of light-emitting devices 111 on the first surface 161A.

The beneficial effects of the backlight module provided by some embodiments of the present disclosure are the same as the beneficial effects of the optical film described above, and details will not be repeated here. It will be understood that, the optical film may be able to replace the light guide plate 120 and the diffusion plate 140 included in the backlight module shown in FIG. 8, and there is no need to increase the optical distance between the dot matrix light source 110 and the diffusion plate 140. Therefore, the backlight module provided by some embodiments of the present disclosure may have a relatively small thickness.

In some embodiments, as shown in FIG. 11, in order to ensure an optimal effect of the first annular lens group 162, the geometrical center of the light-emitting device 111 and the central axis of the first annular lens group 162 are arranged in a straight line. In this way, light in regions with relatively higher brightness may be dispersed to regions with relatively lower brightness, so as to better uniform the light and alleviate the problems of lamp shadows and halos.

In some embodiments, as shown in FIGS. 9 and 11, in a case where the optical film 160 includes the second annular lenses 1630, the orthographic projection of the at least one light-emitting device 111 on the first surface 161A is located within at least one light coverage region A1. It will be understood that, the orthographic projection of each light-emitting device 111 on the first surface 161A are arranged in one-to-one correspondence with the light coverage regions A1, so as to avoid light mixing between two adjacent light-emitting devices 111.

In some embodiments, as shown in FIG. 9, in order to further improve a brightness of emergent light rays of a backlight, the backlight module further includes a reflective plate 130. The reflective plate 130 is proximate to the first surface 161A, and the at least one light-emitting device 111 is located between the reflective plate 130 and the first surface 161A. The reflective plate 130 can reflect light that exits the first surface 161 but is not reflected by the second annular lens group 163, thus further improving the brightness of emergent light rays.

In some embodiments, as shown in FIG. 9, the backlight module further includes a brightness enhancement film 150. The brightness enhancement film 150 is proximate to the second surface 161B of the light-transmissive substrate 161. The at least one first annular lens group 162 is disposed between the brightness enhancement film 150 and the second surface 161B, so as to further increase the brightness of the emergent light rays provided by the backlight module.

In some embodiments of the present disclosure, the display apparatus includes the backlight module 100 shown in FIG. 9, and may further include the display panel 200 shown in FIG. 2. It will be understood that the display panel 200 herein may also be a display panel of other structures. The backlight module 100 is configured to provide backlight for the display panel 200.

The beneficial effects of the display apparatus provided in some embodiments of the present disclosure are the same as those of the optical film described above, which will not be elaborated herein again.

The display apparatus provided in the above embodiments may be any product or component having a display function, such as a mobile phone, a tablet computer, a television, a display, a notebook computer, a digital photo frame, or a navigator.

In the description of the above embodiments, specific features, structures, materials, or characteristics may be combined in any suitable manner in any one or more embodiments or examples.

The forgoing descriptions are merely specific implementation manners of the present disclosure, but the protection scope of the present disclosure is not limited thereto. A person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. An optical film, comprising:
   a light-transmissive substrate having a first surface and a second surface opposite to each other; and
   a first annular lens group disposed on the second surface, the first annular lens group being configured to allow light to pass through, wherein the first annular lens group includes a plurality of first annular lenses, the plurality of first annular lenses are substantially concentric about a central axis of the first annular lens group and arranged radially adjacent to one another, and each first annular lens has an inner surface,
   wherein angles between inner surfaces of the plurality of first annular lenses and the second surface decrease in a direction away from the central axis, so that reflectivity of the first annular lens group decreases along the direction away from the central axis, and an extending direction of the central axis is the same as a thickness direction of the light-transmissive substrate,
   wherein a distance between the inner surface of each first annular lens and the central axis in a radial direction of the first annular lens decreases along a direction that is parallel to the central axis and points toward the second surface, and
   wherein angles each between the second surface and a tangent plane of an inner surface of a corresponding first annular lens in the plurality of first annular lenses are acute angles and decrease in the direction away from the central axis.

2. The optical film according to claim 1, wherein the angles each between the second surface and the tangent plane of the inner surface of the corresponding first annular lens in the plurality of first annular lenses are different from each other, or
   some of the angles each between the second surface and the tangent plane of the inner surface of the corresponding first annular lens in the plurality of first annular lenses are the same.

3. The optical film according to claim 1, wherein an intersecting line of the inner surface of the first annular lens and a plane passing through the central axis includes at least one of at least one straight line segment or at least one curved line segment;
   the at least one straight line segment includes a straight line segment that is continuously inclined with respect to the second surface, or straight line segments that are connected in a stepped shape and intermittently inclined with respect to the second surface; and
   the at least one curved line segment includes a curved line segment that is continuously inclined with respect to the second surface or curved line segments that are connected in another stepped shape and intermittently inclined with respect to the second surface.

4. The optical film according to claim 1, wherein the first surface has a light coverage region and a non-light coverage region surrounding the light coverage region;
   an orthographic projection of the first annular lens group on the first surface covers both the light coverage region and the non-light coverage region.

5. The optical film according to claim 4, further comprising a second annular lens group disposed on the first surface, wherein
   the second annular lens group is located in the non-light coverage region and configured to reflect light, and the second annular lens group includes a plurality of second annular lenses arranged radially adjacent to one another.

6. The optical film according to claim 5, wherein refractive index of the first annular lens group is greater than refractive index of air; and/or,
   refractive index of the second annular lens group is greater than the refractive index of air.

7. The optical film according to claim 5, wherein a distance between an outer surface of each second annular lens and its central axis in a radial direction of the second annular lens increases along the direction that is parallel to the central axis of the second annular lens and points toward the first surface.

8. The optical film according to claim 7, wherein angles each between the first surface and a tangent plane of an outer surface of a corresponding second annular lens in the plurality of second annular lenses are the same; or, the angles between the first surface and the tangent plane of the outer surface of the corresponding second annular lens in the plurality of second annular lenses are different from each other.

9. The optical film according to claim 7, wherein each of intersecting lines of the outer surface of the second annular lens and a plane passing through the central axis of the second annular lens includes at least one of at least one straight line segment or at least one curved line segment;
the at least one straight line segment includes a straight line segment that is continuously inclined with respect to the first surface or straight line segments that are connected in a stepped shape and intermittently inclined with respect to the first surface; and
the at least one curved line segment includes a curved line segment that is continuously inclined with respect to the first surface or curved line segments that are connected in another stepped shape and intermittently inclined with respect to the first surface.

10. A backlight module, comprising:
the optical film according to claim 1; and
a light-emitting device disposed at a side of the first surface of the light-transmissive substrate, wherein
an orthographic projection of the light-emitting device on the first surface is within an orthographic projection of the first annular lens group on the first surface.

11. The backlight module according to claim 10, wherein the first surface has a light coverage region and a non-light coverage region surrounding the light coverage region; and
the orthographic projection of the light-emitting device on the first surface is located in the light coverage region;
the orthographic projection of the first annular lens group on the first surface covers both the light coverage region and the non-light coverage region.

12. The backlight module according to claim 10, further comprising:
a reflective plate disposed at a side of the light-emitting device away from the first surface; and/or,
a brightness enhancement film disposed at a side of the first annular lens group away from the light-transmissive substrate.

13. The backlight module according to claim 10, wherein the light-emitting device includes a mini light-emitting diode (Mini LED).

14. A display apparatus, comprising:
a display panel; and
the backlight module according to claim 10, the backlight module being configured to provide backlight for the display panel.

15. A method of manufacturing the optical film according to claim 1, the method comprising:
forming the first annular lens group on the second surface of the light-transmissive substrate, wherein the reflectivity of the first annular lens group decreases along the direction away from the central axis, and the extending direction of the central axis is the same as the thickness direction of the light-transmissive substrate;
in a case where the first surface of the light-transmissive substrate has a light coverage region and a non-light coverage region surrounding the light coverage region, the method further comprising:
forming a second annular lens group in the non-light coverage region on the first surface of the light-transmissive substrate, wherein an orthographic projection of the first annular lens group on the first surface covers both the light coverage region and the non-light coverage region.

16. The method according to claim 15, wherein forming the first annular lens group on the second surface of the light-transmissive substrate includes:
forming the first annular lens group on the second surface through an etching process; or
forming the first annular lens group on the second surface through an imprinting process.

17. The method according to claim 16, wherein forming the first annular lens group on the second surface through the imprinting process, includes:
forming a curable light-transmissive resin layer on the second surface;
performing imprinting on the curable light-transmissive resin layer to form first annular lens group to be cured; and
curing the first annular lens group to be cured to form the first annular lens group.

* * * * *